United States Patent [19]
Dubust et al.

[11] Patent Number: 4,505,945
[45] Date of Patent: Mar. 19, 1985

[54] PROCESS AND APPARATUS FOR COATING A MEMBER BY PLASMA SPRAYING

[75] Inventors: Jean-Claude Dubust, Limours; Marcel Boncoeur, Paris; Bernard Hansz, Vertle Petit, all of France

[73] Assignee: Commissariat a l'Energie Atomique, Paris, France

[21] Appl. No.: 605,611

[22] Filed: Apr. 30, 1984

[30] Foreign Application Priority Data

Apr. 29, 1983 [FR] France ................. 83 07165

[51] Int. Cl.$^3$ ............................................. B05D 1/08
[52] U.S. Cl. .................................... 427/8; 219/121 PN; 118/666; 118/668; 427/34; 427/398.3; 427/423
[58] Field of Search ................... 427/34, 8, 423; 219/121 PN, 121 P; 427/398.3; 118/666, 668

[56] References Cited

U.S. PATENT DOCUMENTS

| | | | |
|---|---|---|---|
| 2,330,202 | 9/1943 | Brennan | 427/398.3 |
| 3,114,826 | 12/1963 | Sullivan et al. | 427/34 |
| 3,470,347 | 9/1969 | Jackson | 427/34 |
| 3,839,618 | 10/1974 | Muehlberger | 427/34 |
| 3,954,704 | 4/1976 | Bejat et al. | 118/729 |
| 4,328,257 | 5/1982 | Muehlberger | 427/34 |
| 4,358,471 | 11/1982 | Derkacs et al. | 427/34 |

FOREIGN PATENT DOCUMENTS

| | | |
|---|---|---|
| 10632 | 4/1977 | European Pat. Off. . |
| 2153080 | 4/1973 | France . |
| 2224991 | 10/1974 | France . |
| 2301155 | 2/1975 | France . |
| 2347111 | 11/1977 | France . |
| 159785 | 4/1983 | German Democratic Rep. ... 427/34 |
| 2063926 | 6/1981 | United Kingdom . |

OTHER PUBLICATIONS

*Journal of Metals,* Jan. 1959, pp. 40–42.

Primary Examiner—John H. Newsome
Attorney, Agent, or Firm—Pearne, Gordon, Sessions, McCoy, Granger & Tilberry

[57] ABSTRACT

The invention relates to a process and an apparatus for coating a member by plasma spraying.

According to the invention, the pressure and composition of the atmosphere prevailing in the enclosure in which the operation takes place are constantly checked. The temperature of the member is regulated with the aid of a cooling system and the relative displacements of the member, the gun and the cooling system are automatically controlled.

Application to the deposition of protective coatings on metal members or on composite materials.

24 Claims, 7 Drawing Figures

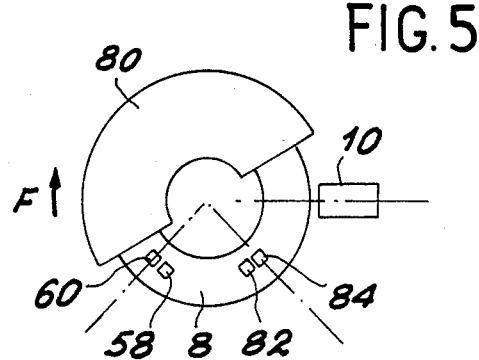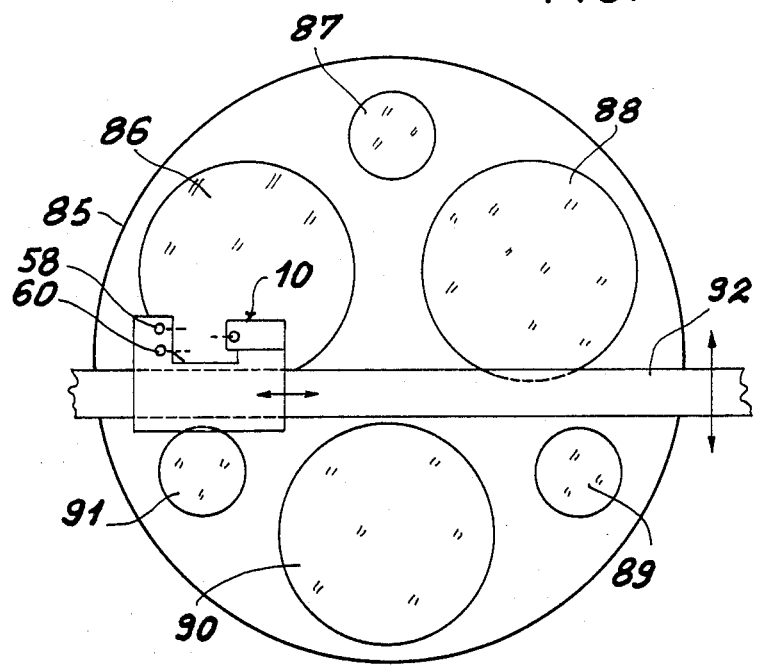

PROCESS AND APPARATUS FOR COATING A MEMBER BY PLASMA SPRAYING

BACKGROUND OF THE INVENTION

The present invention relates to a plasma spraying process and apparatus, which more particularly makes it possible to form deposits on substrates having a poor resistance to high temperatures. It also makes it possible to deposit chemically active substances or substances with a strong affinity for oxygen.

Plasma spraying is well known and widely used for producing coatings, e.g. on composite materials, such as resins or plastics which have to be coated with metallic or ceramic coatings. This process is also used for forming protective coatings in the mechanical field (aeronautical or automobile alloys) or in the nuclear field (production of absorption barriers).

Initially this operation was performed in air, which made it impossible to deposit certain materials which react with oxygen, such as borides and carbides. Deposition is also not possible on supports, which are themselves reactive, such as aluminium, magnesium or their alloys. Consideration was therefore given to the spraying operation being carried out either in a neutral atmosphere, e.g. in chambers under argon, or in an enclosure under a partial vacuum the residual pressure being approximately 50 to 200 millibars. This process makes it possible to operate at high temperatures of approximately 600° to 700° C. and to coat superalloys, whilst facilitating the diffusion of the product sprayed into the basic metal. However, this process cannot always be used when the substrate is a material having poor high temperature resistance. This is the case with certain composite materials, such as resin-bonded silica fibres, which become unstable beyond 120° C. and with which plasma spraying is difficult to envisage, because this operation leads to much higher temperatures. In particular, this method does not make it possible to produce very thick deposits, due to cracking phenomena.

SUMMARY OF THE INVENTION

The object of the present invention is to obviate these disadvantages by proposing a plasma spraying process and apparatus making it possible to deposit any random substance, including highly chemically active substances and substances with an affinity for oxygen on substrates which have a poor resistance to high temperatures, or which are themselves chemically reactive, whilst also making it possible to produce very thick deposits.

The present invention therefore relates to a process for coating a member by plasma spraying using a spray gun which is movable relative to the said member, the operation taking place under a controlled atmosphere within a tight enclosure wherein the pressure and composition of the atmosphere prevailing in the enclosure are maintained constant, the member is cooled in order to regulate the temperature of the different points thereof in accordance with a predetermined program, said operation being carried out with the aid of a cooling system which is movable with respect to said member, and wherein the relative displacements of the member, gun and cooling system are controlled automatically.

According to another feature of this process, there is a continuous analysis of the atmosphere prevailing in the tight enclosure and this atmosphere is checked by scavenging the enclosure with a gas, the scavenging conditions being defined as a function of the results of the analysis.

The member is cooled by spraying droplets of at least one liquid close to its saturation temperature, said droplets being confined to the area of the member where plasma spraying takes place, the liquid close to its saturation temperature preferably being a liquefied gas.

The saturation temperature of a liquid is defined as being the temperature at which the evolution of the vapour or steam dissolved in the liquid commences. In the case of a liquefied gas, the saturation temperature is close to, but different from the boiling temperature. Advantageously, use is made of at least one carrier gas for spraying the droplets and the flow rate and pressure of the liquefied gas and carrier gas are regulated so that the liquefied gas droplets are spherical and have a diameter equal to or below 40 microns.

The use of liquefied gas droplets permits a very energetic cooling and the temperature of the member can be kept at a very low value (approximately 20° to 50° C. and in all cases below 100° C.), even in the spraying area. Thus, as a result of the invention, it is possible to coat any random material, including substances which are unstable at elevated temperatures. It is also possible to produce very thick deposits (1 cm and more), because the cooling is sufficiently energetic to eliminate cracking phenomena. As the atmosphere within the tight enclosure is permanently controlled, parasitic reactions are avoided and it is possible to use any random material as either the substrate or the coating product.

In order to ensure an effective cooling, it is necessary for the liquid droplets to be very small and that they are not mixed with the vapour or steam, which would have the effect of reducing the cooling capacity. The fact that the liquid is in monophase form makes it possible to prevent surges and sudden stoppages within the pipes and makes it easier to obtain droplets with homogeneous dimensions. Liquefied gases are generally stored at temperatures close to their boiling temperature, i.e. close to their saturation temperature, the temperature of use being below the saturation temperature without the difference exceeding 15° C. The expression "temperature close to the saturation temperature" used in the present text designates a temperature, whose variation from the saturation temperature does not exceed 15° C. This prevents the steam from evolving before the liquid mixes with the carrier gas. For example, when the cooling liquid is nitrogen under 1 bar, working takes place at −206° C. for a saturation temperature of approximately −196° C., the latter being determined experimentally. The following table indicates the temperatures used as a function of the pressure for nitrogen and argon.

TABLE

| Pressure (bar) | Nitrogen | Argon |
| --- | --- | --- |
| 1 | −206° C. | −198° C. |
| 2 | −199° C. | −191° C. |
| 3 | −195° C. | −187° C. |

The carrier gas has the effect not only of entraining the liquefied gas, but also of aiding heat exchanges and reducing the surface tension of the liquid, which improves the contact with the material to be cooled. The carrier gas can be a pure gas, such as helium, or a mixture (e.g. helium and argon) and will be chosen as a function of the particular case.

The invention also relates to an apparatus for coating a member by plasma spraying, wherein it comprises a tight enclosure containing a movable support for the member to be coated, a plasma spray gun movable with respect to said member, a cooling system which is also movable relative to said member, temperature sensors for checking the temperature of the member and the atmosphere prevailing in the enclosure, as well as means for analyzing the gas in the enclosure, means for scavenging the enclosure with the aid of a gas and a device for synchronizing the relative movements of the member, the gun and the cooling system.

The support of the member to be coated can rotate about a vertical axis, e.g. if the member has a symmetry of revolution, or can be in the form of a disk which is rotatable in a vertical plane (in the case of a flat member), or can have a random orientation as a function of the particular case.

Advantageously, it is possible to provide a rotary passage in the support for the wires of the temperature sensors, when the latter are placed within the member.

According to another feature of this apparatus, the spray gun comprises an anode essentially shaped like a hollow cylinder, a cathode arranged substantially concentrically to the anode and an outer envelope surrounding the anode and having a shape such that it defines about the anode and the cathode a passage making it possible to circulate a cooling liquid, said passage defining around the anode a chamber having sufficiently small dimensions to enable the liquid to flow around the anode at an adequate speed to ensure cooling with maximum efficiency.

In the preferred embodiment, the anode is made from copper and the parts thereof facing the cathode are covered with rhenium.

According to another feature of the apparatus according to the invention, the cooling system comprises at least one nozzle having an orifice for the discharge of the liquefied gas droplets, at least one liquefied gas tank connected to the nozzle by a first pipe, at least one carrier gas tank connected to the nozzle by a second pipe, a confinement shield positioned in the vicinity of the area of the member where plasma spraying takes place, and at least one temperature sensor for checking the temperature of the member.

According to a preferred embodiment of the apparatus, the nozzle comprises an intake connection for the liquefied gas, a first orifice connecting the intake connection for the liquefied gas to an expansion chamber, a duct connecting the expansion chamber to a second orifice, a cavity into which issues the second orifice and which is linked with the outside by the cooling liquid outlet port, an intake connection for the carrier gas and a duct connecting the intake connection for the carrier gas to said cavity.

According to the preferred embodiment of the apparatus, the nozzle and confinement shield are movable relative to the member and the arrangement of the apparatus is such that the distance between the nozzle orifice and the member remains constant during the relative displacement of the nozzle and member, said distance being between 5 and 100 mm and preferably between 5 and 50 mm.

Advantageously, the first pipe connecting the nozzle to the liquefied gas tank can be a double-jacket pipe.

In order to ensure spraying under good conditions, the dimensions of the first pipe must be such that the liquefied gas is in monophase form when it enters the nozzle.

This result is obtained when the first pipe has a length equal to or less than 5 m and a passage diameter for the liquefied gas equal to or less than 12 mm, if the pressure of the latter is between 1 and 1.5 bar.

Moreover, the different means located within the enclosure are subject to severe conditions, and in particular to an intense electromagnetic field, so that each of them is connected to earth by means of a capacitor.

The synchronization device has read-only memories and the motors controlling the movements of the different movable parts are protected by shielding.

Finally, it is possible to advantageously equip the enclosure in which the spraying takes place with one or more observation windows, which are impermeable to ultraviolet rays, whilst also providing airborne sound insulation.

BRIEF DESCRIPTION OF THE DRAWINGS

The invention is described in greater detail hereinafter relative to non-limitative embodiments and with reference to the attached drawings, wherein show:

FIG. 5 a plan view illustrating the arrangement of the cooling system with respect to the member to be coated.

FIG. 6 a diagrammatic view in elevation showing another embodiment of the support carrying the members to be coated.

DETAILED DESCRIPTION OF THE PREFERRED EMBODIMENTS

Figure 1:
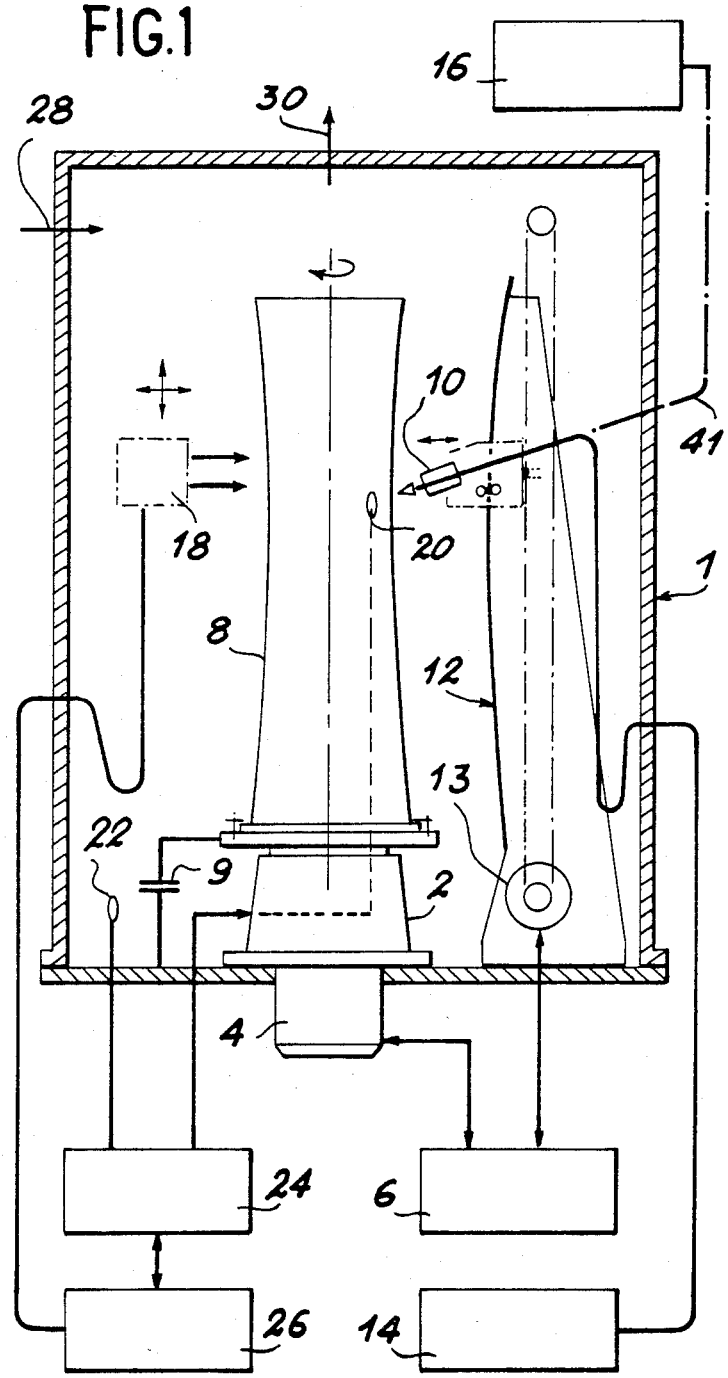
FIG. 1 a diagrammatic vertical sectional view of the apparatus according to the invention.

FIG. 1 shows that the apparatus according to the invention essentially comprises a tight enclosure 1 within which the member 8 to be coated rests on a support 2, which can rotate about a vertical axis by means of motor 4. In the special case described here, the member to be coated 8 has a symmetry of revolution and is placed on support 2 in such a way that its axis of symmetry coincides with the rotation axis of the support. Plasma spraying is carried out by means of a gun 10, which can move along a template 12 by means of a drive mechanism 13.

A synchronization device 6 within the enclosure 1 checks both the movements of gun 10 and of the motor 4, in order that the combination of the rotation of member 8 about its axis and the displacements of the gun along template 12 makes it possible to carry out deposition over the entire surface of member 8. Gun 10 is connected on the one hand to a plasma control panel 14 and on the other to a powder distributor 16 by a hose 41. Panel 14 makes it possible to check the arrival at the gun of the gases necessary for producing the plasma, i.e. in the present case helium and argon, as well as the water necessary for its cooling. The powder distributor 16 contains the sprayed product in pulverulent form. e.g. boron or a composition of refractory substances such as boron carbide. Gun 10 and powder distributor 16 will be described in greater detail hereinafter relative to FIGS. 2 and 3.

FIG. 1 also shows the cooling system 18 used in cooling member 8 in the area where spraying takes place. This system is at the same height as gun 10 relative to member 8 and is also movable along said member by means of synchronization device 6. Cooling system 18 will be described in greater detail relative to FIGS. 4 and 5. In order to best regulate the operating parameters of cooling system 18 and the state of the atmosphere prevailing in enclosure 1, a certain number of temperature sensors are provided to give information on the temperature of member 8 and the atmosphere prevailing in the enclosure. It is possible to see a sensor 20 within the member and a sensor 22 in enclosure 1 connected to a checking device 24, which makes it possible to act on the operating parameters of system 18 by means of a control device 26.

Moreover, in order to regulate the composition of the atmosphere in enclosure 1, the latter is scanned by means of a neutral gas, e.g. argon, whilst a calibrated valve is provided making it possible to discharge the gases contained in the enclosure if the pressure rises above a predetermined value. The introduction of the scavenging gas to the enclosure is symbolized by arrow 28 and the extraction of the gas in the case of an overpressure is symbolized by arrow 30. The composition of the gas contained in the enclosure is constantly analyzed and the scavenging conditions are adjusted as a function of the analysis results. Thus, the actual plasma projection and the cooling of member 8 with the aid of the system 18 introduce into enclosure 1 gases which must be discharged. It is for this reason that there is a constant checking of the pressure and the composition of the atmosphere prevailing in order to regulate the scavenging flow rate on the basis thereof. Scavenging may even be stopped if the composition remains within the prescribed standards and if the pressure remains below the determined limit value.

Thus, through controlling the atmosphere prevailing in the enclosure, it is possible to use as the substrate or substance to be deposited, very chemically active materials, because the operation takes place under a neutral atmosphere, whilst cooling with liquefied gas droplets permits a very effective cooling and consequently the use of materials unstable beyond a relatively low temperature of approximately 100° C. Thus, the use of a cryogenic liquid, e.g. a liquefied gas such as helium, nitrogen or argon, makes it possible to maintain the temperature of the member at a value below 50° C.

Finally, in view of the fact that the creation of a plasma jet leads to the formation of a very intense electromagnetic field in enclosure 1, all the equipment within the same are protected by connecting them to earth via capacitors. FIG. 1 shows capacitor 9 connecting support 2 to the metal earth constituted by the lower wall of enclosure 1. However, all the other members and in particular gun 10 and cooling system 18 are also protected by capacitors. Optionally, it is possible to provide a rotary passage in support 2 for the passage of the wires necessary for the operation of these various means. Other arrangements can be provided, such as observation windows, but the latter must be impermeable to ultraviolet rays, and airborne sound insulation to the large amount of noise produced by the formation of the plasma jet.

Figure 2:
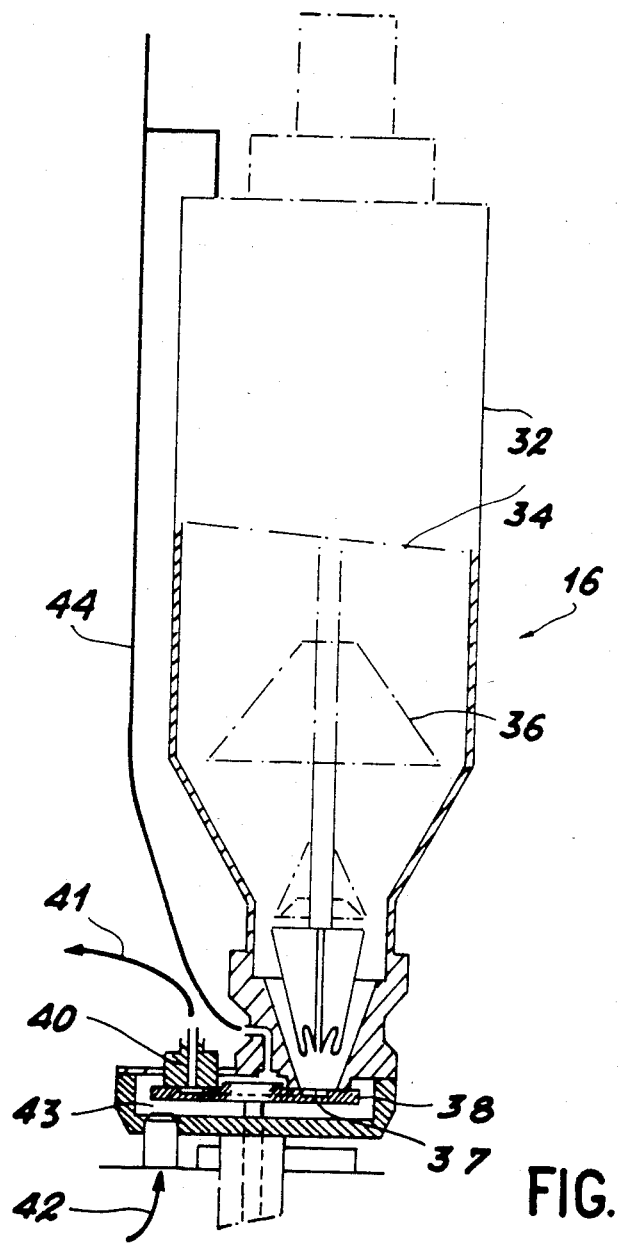
FIG. 2 a diagrammatic vertical sectional view of a powder distributor used in the apparatus of FIG. 1.

FIG. 2 shows the powder distributor 16 in greater detail. It essentially comprises a cylindrical container 32 in which is stored the powder 34, whilst a cone, 36, whose axis coincides with that of container 32, permits a regular outflow of powder. The latter drops into the lower part of the apparatus into an annular groove 37 made on the rotary plate 38, which moves it up to a connection 40 permitting the connection of a hose 41, whose other end is connected to gun 10. The entrainment of the powder is ensured by a gas, e.g. argon, which is supplied by a pipe 42 to a chamber 43, within which plate 38 can rotate. The gas enters groove 37, which ensures the entrainment of the powder and its discharge by hose 41. Finally, a duct 44 permits the circulation of gas along container 32, thus facilitating the discharge of the powder.

Figure 3:
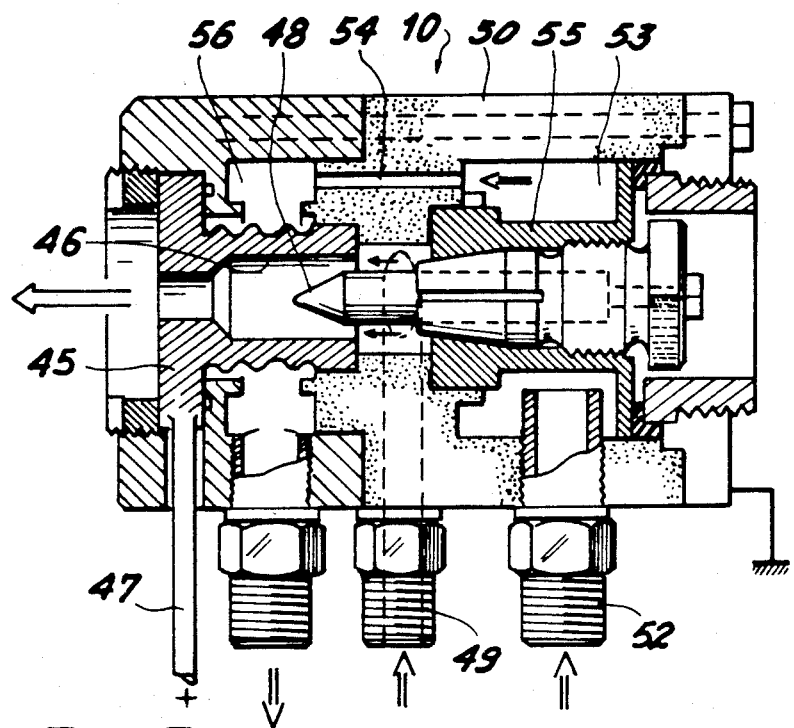
FIG. 3 a diagrammatic sectional view of the spray gun used in the apparatus of FIG. 1.

The gun 10 can best be seen from the sectional view of FIG. 3, where it can be seen that it essentially comprises an anode 45 connected to a not shown power supply by a wire 47. This anode has a symmetry of revolution and is substantially shaped like a hollow cylinder. A passage 46 is provided essentially along the axis of symmetry of the anode and the cathode 48 is located in this space. The cathode and anode are surrounded by an outer envelope 50, which is shaped and dimensioned in such a way that there is provided a passage for the cooling water between the cathode and the anode on the one hand and the outer envelope on the other. It is also possible to see connection 49, which leads the hose supplying the mixture of powder and gas necessary for producing the plasma. In the special embodiment described here, the cathode is made from tungsten and the anode 45 is made from copper internally coated with rhenium in space 46, the rhenium coating thermally protecting the anode.

In view of the large amount of heat given off as a result of the electrical discharge between the anode and the cathode for producing the plasma, an energetic cooling of the gun is necessary. For this purpose there is a circulation of water, which enters the gun by a connection 52 and firstly circulates in a chamber 53 surrounding the cathode support 55, then in a duct 54 and then enters a chamber 56 surrounding the anode. The latter must be adequately cooled to obtain a good outflow of plasma from space 46. To this end, cooling takes place with water, whose temperature is below 10° C. and preferably below 8° C., whilst the dimensions of chamber 56 are sufficiently small for the water to flow out rapidly around the anode and remove the calories produced with maximum efficiency.

Figure 4:
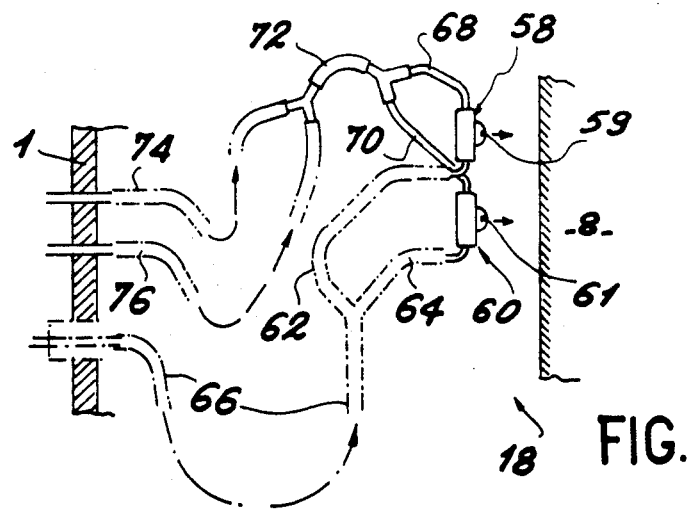
FIG. 4 a diagrammatic view illustrating the cooling system used in the invention.

FIG. 4 shows the cooling system 18 used for maintaining at a very low temperature the member to be coated in the area where deposition is to take place. The drawing shows two nozzles 58, 60 with respective orifices 59, 61 for the discharge of liquefied gas droplets. Nozzles 58, 60 are connected by two pipes 62, 64 to a common pipe 66, which links them with a liquefied gas, e.g. liquid argon tank arranged outside enclosure 1 and not shown in the drawing.

For forming the droplets, it is necessary to entrain the liquefied gas with the aid of another pressurized gas, called the carrier gas. Optionally, it is possible to mix the carrier gas with another gas in order to regulate the surface tension of the liquefied gas droplets and obtain a better cooling when the latter are deposited on the member 8. It can be seen that the nozzles 58, 60 are connected by pipes 68, 70 respectively to a hose 72 permitting the passage of the mixture of carrier gases. Thus, it is possible for example to provide an argon tank and a gaseous helium tank externally of enclosure 1 and connected to hose 72 by pipes 74 and 76 respectively.

It is essential to carefully check the pressure and the flow rate of the liquefied gas and of the carrier gas in such a way that cooling takes place under optimum conditions. The best results are obtained when the liquefied gas droplets are spherical and have a diameter equal to or below 40 microns. In addition, to ensure that these droplets are not heated when in contact with one of the gases present in the enclosure and do not react therewith, the travel distance must be sufficiently small. The distance between the discharge port 59 of nozzle 58 and member 8 must be constant and between 5 and 100 mm, particularly between 5 and 50 mm. The arrangement of the apparatus is such that this distance does not vary when the cooling system is displaced relative to member 8. Finally, the liquefied gas must be in monophase form on entering the nozzle, i.e. it must not be mixed with its vapour. This result is obtained by an appropriate choice of the dimensions of the liquefied gas supply pipe. In the special case described here, the pipes 62, 64 and 66 are double-jacket pipes, i.e. formed from two concentric tubes, between which a vacuum is formed in order to ensure a good insulation. If the liquefied gas pressure is between 1 and 1.5 bar, the distance traversed by the liquid between the tank and the nozzle must be less than 5 m and the passage diameter less than 12 mm.

Figure 7:
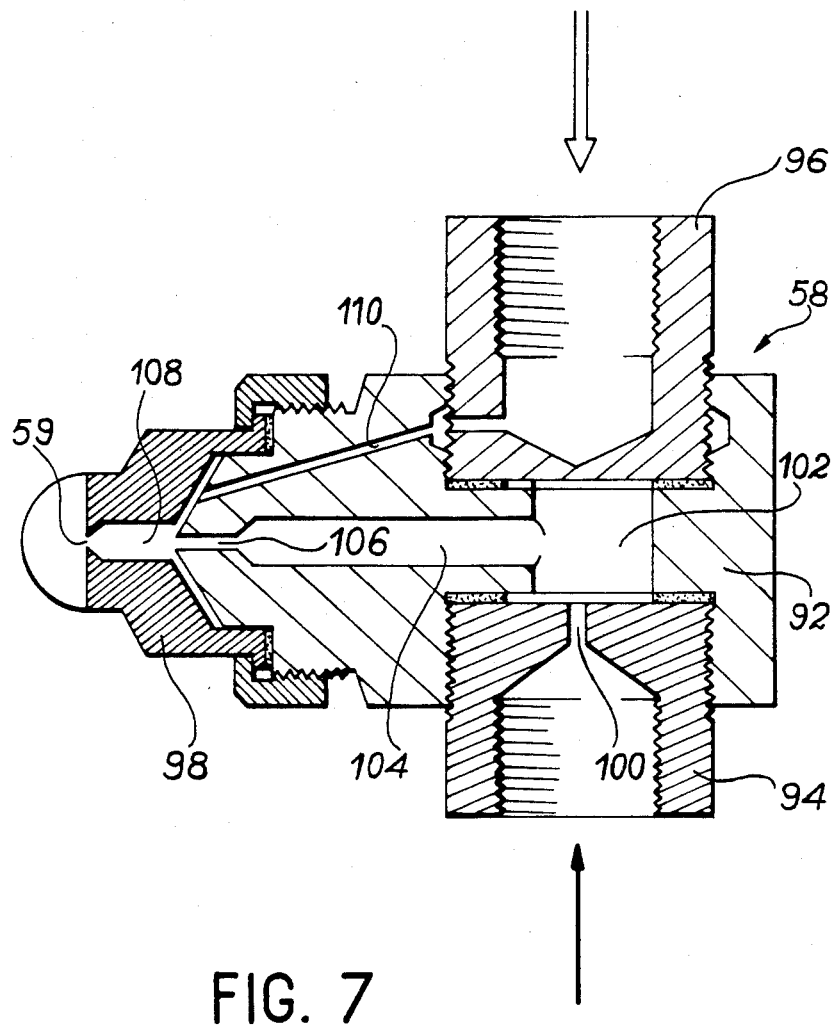
FIG. 7 a diagrammatic sectional view of a nozzle used for spraying the cooling liquid.

FIG. 7 shows in greater detail the construction of a nozzle such as 58 used in the apparatus according to the invention. It comprises a body 92, on which are mounted an intake connection 94 for the cooling liquefied gas and an intake connection 96 for the carrier gas. A head 98, on which is located the cooling liquid discharge port 59, is provided at one end of body 92. The liquefied gas intake connection 94 has an orifice 100, which links it with an expansion chamber 102 in body 92 of the nozzle. The latter also has a duct 104, which links chamber 102 with a second orifice 106, which issues into a cavity 108 in nozzle head 98. Nozzle body 92 also contains a duct 110, which links the carrier gas intake connection 96 with cavity 108.

The nozzle operates in the following way. The liquid entering the intake connection 94 passes through the first orifice 100 and enters chamber 102, where it undergoes a first expansion. It then circulates along duct 104, passes through orifice 106 and enters cavity 108 where it undergoes a second expansion. The carrier gas enters via connection 96, circulates along duct 110 and issues into cavity 108. This not only has the effect of entraining the liquefied gas in droplet form, but also of bursting the droplets in order to make them smaller and give them more homogeneous dimensions.

The plan view of FIG. 5 shows that it is possible to arrange two groups of two nozzles such as 58 and 60 for cooling member 8 in the area where deposition takes place. For example, in FIG. 5, the two nozzles 58 and 60 are positioned in such a way that they cool the surface of the member prior to deposition, i.e. before it passes in front of the orifice of gun 10, whilst two other nozzles 82, 84 make it possible to cool the deposited material immediately after spraying (the member rotating in the direction of arrow F).

It is also possible to see in FIG. 5 a confinement shield 80 surrounding member 8 in the area where deposition takes place over approximately half the circumference of the member. This shield protects the area cooled by nozzles 58, 60 and consequently maintains it at a low temperature before deposition takes place and also makes it possible to keep the deposited product at a sufficiently low temperature by means of the two other nozzles 82, 84.

FIG. 6 illustrates an embodiment of the support for the member to be coated, when the latter is no longer in the form of a solid having a symmetry of revolution, but e.g. in the form of a flat member. In this case, the support is a disk 85, which is positioned vertically and rotates about a horizontal axis, and on which are arranged the members to be coated, which are in the form of flat disks 86, 88 and 90. Optionally, it is possible to place on disk 85 control parts 87, 89, 91, which undergo tests in order to check the result of the spraying operation. In this case, gun 10 and nozzles such as 58 and 60 perform a translatory movement along a guide 92, the synchronization device of FIG. 1 being regulated in such a way that the entire surface of members 86, 88 and 90 is scavenged by the combination of the translatory movement of gun 10 and rotary movement of disk 85. The latter can also have a rotary passage, in the same way as support 2 in FIG. 1. Obviously, although two examples have been described in which the support is mobile in rotation, either about a vertical axis, or about a horizontal axis, other arrangements can be envisaged and in particular with an oblique rotation axis, the synchronization device being regulated as a function of the particular case in order to bring about spraying over the entire surface of the members to be coated.

Thus, the process and apparatus according to the invention has particularly interesting advantages, when they make it possible to carry out deposition of a large number of products on a large number of substrates, even if the materials in question are chemically active, have a strong affinity for oxygen or have a poor resistance to high temperatures. This result is obtained by the permanent checking of the atmosphere prevailing in the enclosure, as well as the cooling system involving the spraying of liquefied gas droplets, which makes it possible to maintain the temperature of the member at very low values, despite the large amount of heat supplied by the plasma. It is also possible to make very thick deposits, e.g. ceramics with a thickness greater than 1 cm.

There are also numerous applications for the present invention, such as the spraying of most materials used in nuclear industry, such as boron and combinations thereof (boron nitride and carbide), borides, silicides and carbides, such as tantalum carbide, as well as the spraying of metals and alloys, e.g. nickel, chromium, zirconium and titanium. An interesting application of the invention is in the nuclear field in connection with the production of neutron protection systems, constituted by a hollow cylinder with a two-layer metal core covered with a tungsten alloy coating, on which is deposited a thin boron carbide coating. Such elements are in particular used for irradiation tests. It is also possible to carry out coatings of absorption barriers in storage caskets used for transporting radioactive waste, whilst in general terms it is possible to spray all neutrophage elements. It is also possible to carry out the rough-shaping of thick parts having a high chemical purity, a good mechanical strength and good machinability. Reference is also made to the production of papers coated with a thin boron coating, (thickness less than 0.2 mm) and emery paper, as well as the production of emery wheels or the formation of wear-preventing coatings on rotary parts.

What is claimed is:

1. A process for coating a member by plasma spraying using a spray gun which is movable relative to the said member, the operation taking place under a controlled atmosphere within a tight enclosure wherein the pressure and composition of the atmosphere prevailing in the enclosure are maintained constant, the member is cooled in order to regulate the temperature of the different points thereof in accordance with a predetermined program, said operation being carried out with the aid of a cooling system which is movable with respect to said member, and wherein the relative displacements of the member, gun and cooling system are controlled automatically.

2. A process according to claim 1, wherein there is a continuous analysis of the atmosphere prevailing in the tight enclosure and said atmosphere is checked by scavenging the enclosure with the aid of a gas, scavenging conditions being determined as a function of the analysis results.

3. A process according to claim 1, wherein the member is cooled by spraying droplets of at least one liquid close to its saturation temperature, said droplets being confined in the area of the member where plasma spraying takes place.

4. A process according to claim 3, wherein the liquid close to its saturation temperature is a liquefied gas.

5. A process according to claim 3, wherein the droplets are sprayed with the aid of at least one carrier gas.

6. A process according to claim 5, wherein the flow rate and pressure of the liquefied gas and carrier gas are regulated so that the liquefied gas droplets are spherical and have a diameter equal to or lessthan 40 microns.

7. An apparatus for coating a member by plasma spraying, wherein it comprises a tight enclosure containing a movable support for the member to be coated, a plasma spray gun movable with respect to said member, a cooling system which is also movable relative to said member, temperature sensors for checking the temperature of the member and of the atmosphere prevailing in the enclosure, as well as means for analyzing the gas in the enclosure, means for scavenging the enclosure with the aid of a gas and a device for synchronizing the relative movements of the member, the gun and the cooling system.

8. An apparatus according to claim 7, wherein the support is rotatable about a vertical axis and in which a rotary passage is provided.

9. An apparatus according to claim 7, wherein the support is in the form of a disk rotatable in a vertical plane and provided with a rotary passage.

10. An apparatus acording to claim 7, wherein the spray gun comprises an anode essentially shaped like a hollow cylinder, a cathode arranged substantially concentrically to the anode and having a shape such that it defines about the anode and the cathode a passage making it possible to circulate a cooling liquid, said passage defining around the anode a chamber having sufficiently small dimensions to enable the liquid to flow around the anode at an adequate speed to ensure cooling with maximum efficiency.

11. An apparatus according to claim 10, wherein the anode is made from copper and wherein those parts of the anode positioned facing the cathode are coated with rhenium.

12. An apparatus according to claim 7, wherein the cooling system comprises at least one nozzle having an orifice for the discharge of the liquefied gas droplets, at least one liquefied gas tank connected to the nozzle by a first pipe, at least one carrier gas tank connected to the nozzle by a second pipe, a confinement shield positioned in the vicinity of the area of the member where plasma spraying takes place, and at least one temperature sensor for checking the temperature of the member.

13. An apparatus according to claim 12, wherein the nozzle comprises an intake connection for the liquefied gas, a first orifice connecting the intake connection for the liquefied gas to an expansion chamber, a duct connecting the expansion chamber to a second orifice, a cavity into which issues the second orifice and which is linked with the outside by the cooling liquid outlet port, an intake connection for the carrier gas and a duct connecting the intake connection for the carrier gas to said cavity.

14. An apparatus according to claim 12, wherein the nozzle and confinement shield are movable with respect to the member.

15. An apparatus according to claim 14, wherein the arrangement of the apparatus is such that the distance between the nozzle orifice and the member remain constant during the relative displacement of the nozzle and the member.

16. An apparatus according to claim 15, wherein the distance between the orifice and the member is between 5 and 100 mm.

17. An apparatus according to claim 16, wherein the distance between the orifice and the member is between 5 and 50 mm.

18. An apparatus according to claim 12, wherein the first pipe connecting the nozzle to the liquefied gas tank is a double-jacket pipe.

19. An apparatus according to claim 12, wherein the dimensions of the first pipe are such that the liquefied gas in in monophase form on entering the nozzle.

20. An apparatus according to claim 18, wherein the first pipe has a length equal to or less than 5 m and a liquefied gas passage diameter equal to or less than 12 mm, when the pressure of the latter is between 1 and 1.5 bar.

21. An apparatus according to claim 12, wherein the device for synchronizing the movements of the different moving parts has read-only memories with motors protected by a shield.

22. An apparatus according to claim 12, wherein each device within the enclosure is connected to earth by a capacitor.

23. An apparatus according to claim 12, wherein the tight enclosure is provided with at least one observation window, which is impermeable to ultraviolet rays.

24. An apparatus according to claim 12, wherein the tight enclosure is provided with an airborne sound insulation.

* * * * *